United States Patent
Reiback

[15] 3,679,888
[45] July 25, 1972

[54] VARIABLE LIGHT PROJECTION APPARATUS

[72] Inventor: Earl M. Reiback, 20 E. 9th St., New York, N.Y. 10003

[22] Filed: Aug. 27, 1970

[21] Appl. No.: 67,309

[52] U.S. Cl..................240/10.1, 40/106.52, 40/106.53, 240/3.1
[51] Int. Cl................................................F21p 3/00
[58] Field of Search ....................240/10.1, 28, 84, 3.1; 40/106.52, 106.53, 106.54, 132 C, 132 E, 132 D; 272/10, 15, 17

[56] References Cited

UNITED STATES PATENTS

| | | |
|---|---|---|
| 3,050,888 | 8/1962 | Myers et al..........................40/132 E |
| 3,184,872 | 5/1965 | Way.................................40/106.53 |
| 3,242,330 | 3/1966 | Schoffer..............................240/10.1 |
| 3,315,391 | 4/1967 | Lane et al..........................40/106.52 |
| 3,366,786 | 1/1968 | Delano.................................240/3.1 |
| 3,538,323 | 11/1970 | Ziegler..............................240/10.1 |

*Primary Examiner*—Louis J. Capozi
*Attorney*—Hubbell, Cohen & Stiefel

[57] ABSTRACT

Apparatus for projecting continuously variable, multicolored, random patterns of light onto a translucent screen includes a lamp and a screen. It further includes a multicolored transparent wheel and a crinkle-surfaced reflecting disk, each in a frictional engagement with a motor-driven turntable. Optionally a reflecting strip extends from the turntable eccentrically of its axis of rotation. The screen is preferably transparent plastic containing a light absorbent dye and having a matte front and sandblasted rear surface.

8 Claims, 3 Drawing Figures

PATENTED JUL 25 1972  3,679,888

INVENTOR
EARL M. REIBACK
BY
ATTORNEYS.

VARIABLE LIGHT PROJECTION APPARATUS

FIELD OF THE INVENTION

The present invention is related to the projection of variable light patterns on a translucent screen.

SUMMARY OF THE INVENTION

The apparatus of the present invention produces variable, multicolored decorative patterns of light on a screen, which preferably appears as a neutral dark background. Slowly, the images move across the screen, continually changing in size, shape and color, thereby creating an overall pleasing esthetic effect. The present apparatus may be employed in the home or elsewhere to enhance the decor and create a soothing mood with its unique effect.

In an embodiment of the present invention, light emanating from a clear lightbulb without a reflector, thereby approximating a point source, is directed through an aperture at a portion of a revolving multicolored, transparent wheel, so that as the wheel revolves, the colors of the light transmitted therethrough change continually. The colored light then impinges upon a moving element which has a multiplicity of non-coplanar reflective surfaces. Thus, the reflective element may have a corrugated, or crinkled, surface, preferably in a random fashion in both dimensions. Patterns of light are thereupon produced by permitting reflections from the crinkle-surfaced reflective element to be cast on a translucent screen, through which the light patterns are viewed. As the color wheel and reflective element are rotated, the projected images move about the screen, changing shape and color in seemingly random fashion, creating the unique effect of the present invention.

To increase the variety of the patterns, a second reflective element, i.e., a reflective strip, may be rotated so as to be intermittently interposed between the multicolored transparent wheel and the reflective disk, thereby projecting a different sequence of patterned reflections on the screen.

Preferably, the color wheel, reflective disk, and optional reflective strip are turned by a single motor. This may be accomplished by a motor-driven turntable, with which the edges of the color wheel and reflective disk, respectively, are frictionally engaged. The optional reflective strip may be affixed directly to the turntable and extend therefrom, preferably eccentrically of the axis of rotation.

Any sort of translucent projection screen may be used to view the images produced by the apparatus of the present invention. However, a most striking effect of contrast is produced when the background appears dark, nearly black. Such a screen may be made of plastic having a suitable amount of a dye, preferably neutral in color, incorporated therewith. The front of the screen preferably is a matte surface, thereby minimizing reflections from stray light hitting the front, and the rear surface is preferably sandblasted for maximum diffusion of the light projected thereupon. The entire apparatus may be housed in a boxlike enclosure, the front of which comprises the screen.

DESCRIPTION OF THE PREFERRED EMBODIMENT

Figure 1:
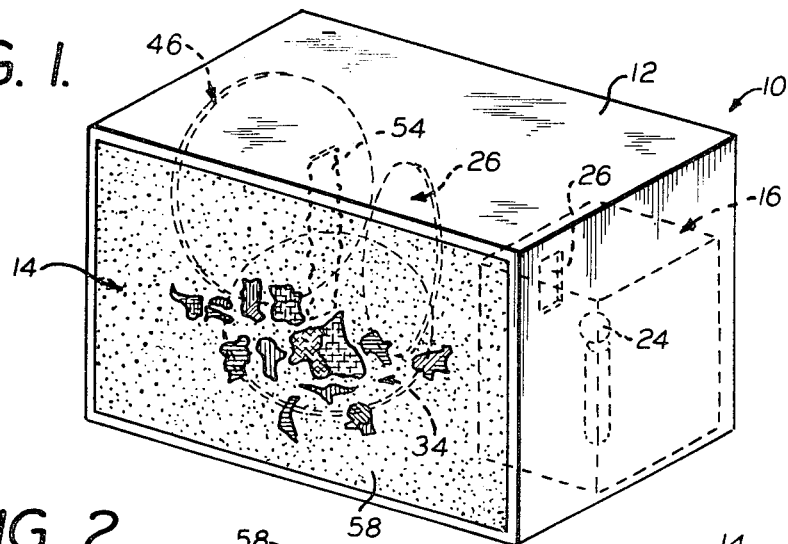
FIG. 1 is a perspective view, with hidden parts shown in phantom, of a preferred embodiment of the present invention.

The variable light projection apparatus 10 of the present invention preferably comprises a boxlike enclosure 12, having five opaque wall elements with dull black interior surfaces to minimize reflection. A translucent screen 14, to be described in more detail hereinbelow, forms the sixth side, or front, of the enclosure 12.

A light box 16 is secured within the enclosure 12, preferably in a corner thereof, so that the rear, bottom, and one side of the light box 16 are formed by portions of the corresponding wall elements of the enclosure 12. A front element 18, side element 20 and top element 22 of the light box 16 are secured within the enclosure 12.

A light source 24 is secured within the light box 16. The light source 24 preferably comprises a clear lightbulb, without reflector, the filament of which approximates a point source so that sharp images are produced upon reflection, as described hereinbelow.

The side element 20 of the light box 16 has an aperture 26 which is so disposed with respect to the light source 24 that the screen 14 receives no direct illumination. Instead, the rays from the light source 24 are directed toward a vertically disposed transparent color wheel 26, which is rotatably supported by a bracket 28 fixed to the enclosure 12.

The color wheel 26 may comprise a disk of a colorless, transparent material 30, e.g., glass or polymethylmethacrylate, having transparent dyes or paints 32 of various colors applied thereto either in random manner or in any desired overall pattern. Particularly desirable effects are obtained by permitting adjacent areas of paint 32 to overlap or fuse into one another, giving rise to gradual changes of color at the interfaces. Alternatively, colored cellophane or glass could be substituted for the paint 32.

A turntable 34 is disposed horizontally within the enclosure 12 in tangential contact with the edge of the color wheel 26. The turntable 34 preferably comprises a supporting base plate 36 covered with a layer of friction material 38, e.g., urethane foam, which engages the edge of the color wheel 26 for simultaneous rotation.

The base plate 36 of the turntable 34 is centrally supported on a shaft 40, which extends vertically from a drive train 42. The drive train 42, which may be a single reduction gear, is driven by an electric motor 44, e.g., of the type used in clocks.

When the motor 44 is in operation, the shaft 40 extending from the drive train 42 rotates the turntable 34, which in turn rotates the color wheel 26. As the color wheel 26 rotates, the several colors of the light rays emerging therefrom are thereby varied in accordance with the colors of the paint 32 on the areas of the color wheel 26 through which the rays pass.

A vertically disposed reflective disk 46 is mounted for rotation on a bracket 48 secured to the enclosure 12. The reflective disk 46 preferably comprises a support disk 50 and a reflective element 52 secured thereto, although these two elements could be combined in one integral piece. The edge of the reflective disk 46 is also in tangential contact with the frictional layer 38 of the turntable 34, and, like the color wheel 26, is so disposed that rotation of the turntable 34 induces rotation in the reflective disk 46.

The reflective element 52 of the reflective disk 46 has a plurality of surfaces that are not coplanar. Preferably the reflective element is made from a thin sheet of highly polished metal having fold lines, or wrinkles, randomly distributed thereover, so that the surface is two-dimensionally corrugated in an uneven manner, or crinkled.

The reflective disk 46 and color wheel 26 are disposed within the housing 12 such that the light from the lamp 24 passes first through the color wheel 26 and then impinges on the reflective disk 46, to be reflected as irregular, colored images, or patterns, onto the screen 14 by the crinkled surface of the reflecting element 52.

As noted hereinabove, as the motor 44 causes the turntable 34 to rotate, the color wheel 26 is rotated thereby, so that the colors of the light patterns projected onto the screen vary continually. Because the reflective disk 46 is also in frictional engagement with the turntable 34, it is also rotated therewith. Thus, the light impinges on moving, continually changing reflective surfaces; and being reflected therefrom, the colored images of light projected onto the screen thereby appear to move and change configuration continually.

Depending upon the effect desired, the turntable 34 may be rotated at any desired speed. It is preferred, however, to produce a light display in which the predominant effects are slow movement and change. Conversely, it is not desired that the patterns repeat after a short period of time. Thus, the motor 44 and gear ratio of the drive train 42 are preferably selected to provide slow rotation of the turntable 34 so that movement of the images on the screen 14 is just perceptible. Furthermore, to lengthen the period of time between pattern repeats, it is preferable that the angular velocity of the color wheel 26 be different from that of the reflective disk 46, so that when the reflective disk 46 has rotated once and begins to repeat the patterns previously displayed, the color wheel 26 will not be in its original position, and the colors displayed on the screen will be different from those originally shown in corresponding patterns. This can be accomplished either by making disks 26 and 46 of different diameters, as shown, or by having them engage the turntable 34 at different distances from its axis of rotation, or both. Preferably, the angular velocities of disks 26 and 46 are not integral multiples of one another.

To add further variety, an additional reflective member is preferably employed in the present apparatus. As shown in the drawings, a reflective strip 54, crinkled in the same manner as the reflective element 52 of the disk 46, is mounted upright on the turntable 34 in such position that as the turntable 34 is rotated, the strip 54 alternately crosses the path of light from the lamp 24 and moves away therefrom. Thus, when the turntable 34 is so disposed that reflective strip 54 lies across the light path, the light is reflected from the reflective strip 54 onto the screen 14. When the reflective strip 54 has rotated out of the light path, the light then travels to the reflective disk 46 and is reflected therefrom onto the screen. Inasmuch as the reflective disk 46 would form a different pattern of light from that formed by the reflective strip 54 because the corresponding reflective surfaces are different, it is clear that the alternation of reflection by first one reflective member and then another will increase the variety of patterns ultimately produced by the apparatus 10. When the rotation period of the turntable 34 is different from that of the reflective disk 46, it is clear that, for the same reason as discussed hereinabove with respect to the color wheel 26, the use of a reflective strip 54 on the turntable 34, increases the time for one apparatus to go through one complete cycle.

The screen 14 may optionally be of any type on which images may be projected from the rear, such as a conventional ground glass screen. However, it has been found that the effect of the present invention is greatly enhanced by the use of a special screen which appears black to the viewer and yet which permits the multicolored images to be projected from within the enclosure 12. Thus, the overall effect is that of a box having a black front with multicolored images slowly changing shape and moving about this contrasting background.

The viewing screen of the present invention is preferably of transparent plastic, most preferably polymethylmethacrylate. The light transmittance on the screen is reduced, as by incorporating a transparent dye in the plastic, or by sandwiching a sheet of transparent light absorbent material between two sheets of plastic. The light transmittance of the plastic must be reduced by at least approximately 10 percent to produce the desirable dark field effect. Preferably, the light absorbent substance is neutral, so that all colors are absorbed to approximately the same extent. Most preferably, sufficient light absorbent substance is utilized to reduce the overall amount of light transmission through the plastic sheet to about 40 percent or less. In the presently preferred embodiment, the light transmission is between about 25 and 30 percent.

To enhance the dark field effect produced by the light absorbent substance, it is desirable that the front surface of the screen, through which the images are viewed, have an irregular, or matte finish. With such a finish, it appears that the irregularities do not have sharp radii of curvature. A matte surface such as this may be obtained by appropriate casting of the plastic or by sandblasting and subsequent oiling. In a preferred embodiment, the matte finish utilized is a cast finish, designated by Rohm and Haas Co. as P-80. A matte finished surface appears to enhance the dark field effect by minimizing reflections from stray light in the surrounding environment. However, it does not give enough light diffusion so that the images may be observed from various positions at different angles with respect to the screen.

To obtain sufficient light diffusion so that the images can be seen from a wide variety of angles, the rear surface is made rough, as by sandblasting or other means conventionally employed to obtain a finish like that of ground glass. Such a rear surface, on which the images are projected, appears gray, which is believed to be indicative of small, very sharp surface discontinuities. The front, however, appears black because of the high light absorbence of the plastic and the matte finish.

Figure 2:
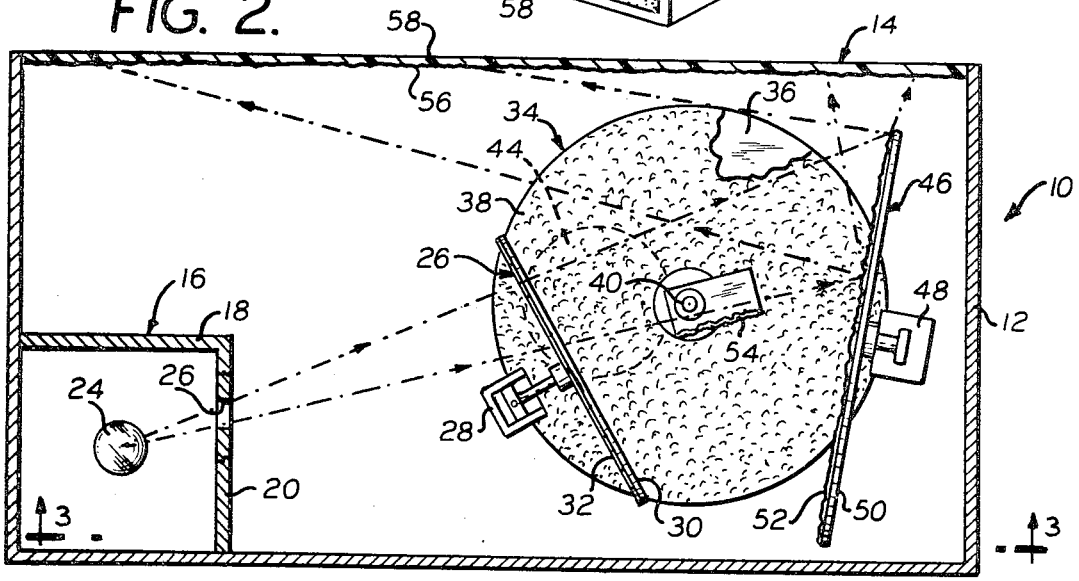
FIG. 2 is a top plan view of the apparatus illustrated in FIG. 1.
Figure 3:
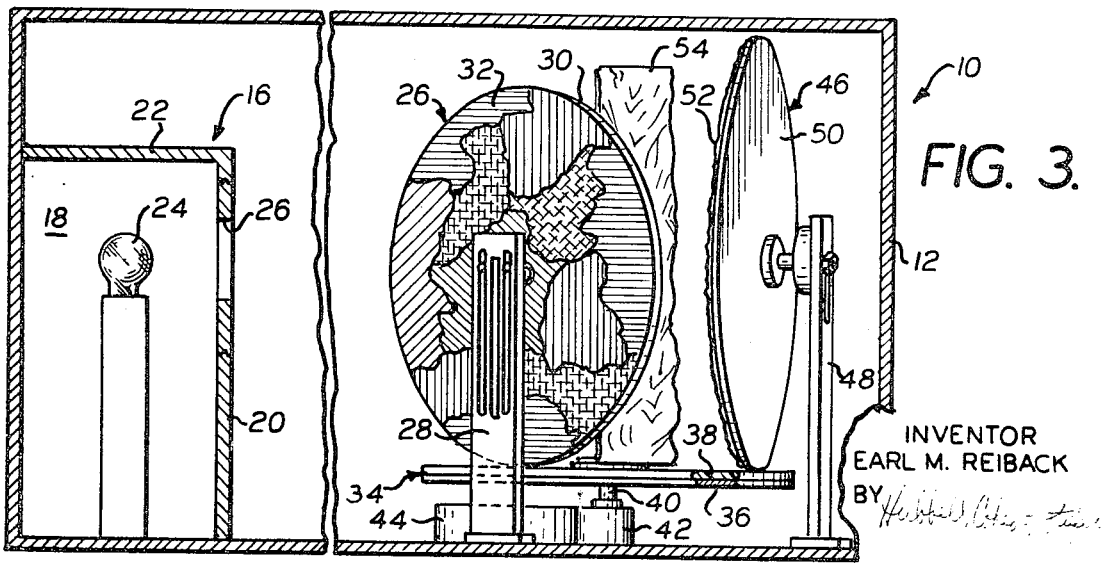
FIG. 3 is a view taken along the line 3—3 of FIG. 2.

As shown in FIG. 2, the screen 14 preferably forms a front wall for the enclosure 12. The rough, preferably sandblasted, surface 56 of the screen is disposed toward the inside of the enclosure and receives the images projected directly upon it from the reflective members 52 and 54. The matte surface, preferably a P-80 surface, is disposed toward the outside of the apparatus 10, so that the black appearance of the matte surface 58 presents itself to the viewer.

Thus, in the preferred embodiment of the present apparatus 10, multicolored images appear to move about and change in form and color on the contrasting black background of the screen 14.

Variations may, of course, be made without departing from the scope and spirit of this invention in accordance with the appended claims.

What is claimed is:

1. Variable light projection apparatus comprising
   a light source,
   a viewing screen,
   a reflective member for projecting light emanating from said light source onto at least a portion of said viewing screen, said reflective member having a multiplicity of non-coplanar reflecting surfaces,
   masking means for shielding said screen from direct illumination from said light source and for directing light from said light source onto at least a portion of said reflective member,
   a multicolored light transmitting element interposed between said light source and said reflective member,
   a motor,
   means for transmitting said rotation of said motor to said multicolored light transmitting element and said reflective member,
   said reflective member comprising a reflective disk and said multicolored light transmitting element comprising a substantially transparent color wheel, and wherein said means for transmitting rotation comprises a common turntable driven by said motor, said turntable being in direct frictional engagement with both edges of said color wheel and said reflective disk, respectively, said reflective disk and said color wheel being so disposed with respect to said common turntable that rotation of said common turntable induces simultaneous rotation of said reflective disk and said color wheel at unequal respective angular velocities.

2. The apparatus of claim 1, wherein the angular velocities of said reflective disk and said color wheel are not integral multiples of each other.

3. The apparatus of claim 1, wherein said viewing screen comprises a transparent sheet, means incorporated in said sheet for decreasing the light transmittance thereof by at least 10 percent, said sheet having a rough rear surface and a matte front surface, and wherein
   said light is projected from said reflective member onto said rear surface and said screen is viewed from said front surface.

4. The apparatus of claim 1 wherein said turntable has an axis of rotation and said reflective disk and said color wheel are of substantially equal diameter and are disposed with respect to said common turntable with said edges substantially normal thereto in said frictional engagement at different radial distances from said turntable axis of rotation, whereby said respective angular velocities are unequal.

5. The apparatus of claim 1 wherein said turntable has an axis of rotation and said reflective disk and said color wheel are of unequal diameter and are disposed with respect to said common turntable with said edges substantially normal thereto in said frictional engagement at substantially equal radial distances from said turntable axis of rotation, whereby said respective angular velocities are unequal.

6. Variable light projection apparatus comprising
a light source;
a viewing screen;
a first reflective member for projecting light emanating from said light source onto at least a portion of said viewing screen, said first reflective member having a multiplicity of non-coplanar reflecting surfaces;
masking means for shielding said screen from direct illumination from said light source and for directing light from said light source onto at least a portion of said first reflective member;
a multicolored light transmitting element interposed between said light source and said first reflective member;
a motor;
means for transmitting said rotation of said motor to said multicolored light transmitting element and said first reflective member, said first reflective member comprising a reflective disk, said multicolored light transmitting element comprising a substantially transparent color wheel, and said means for transmitting rotation comprising a turntable driven by said motor, said turntable being in frictional engagement with the edges of said color wheel and said reflective disk, respectively, said reflective disk and said color wheel being so disposed that rotation of said turntable induces rotation of said reflective disk and said color wheel; and
a second reflective member having a multiplicity of non-coplanar reflecting surfaces, said second reflective member being affixed to said turntable and disposed so that upon rotation of said turntable, said second reflective member is intermittently interposed in said light path between said light source and said reflective disk.

7. The apparatus of claim 6 wherein the angular velocity of said turntable is different from that of said reflective disk and of said color wheel.

8. The apparatus of claim 6 wherein said second reflective member is disposed eccentrically of the axis of rotation of the turntable.

* * * * *